United States Patent [19]

Meyer

[11] 4,193,418
[45] Mar. 18, 1980

[54] ARRANGEMENT FOR PREVENTING EXCESS PRESSURE IN THE HOUSING OF SHUT-OFF VALVES

[75] Inventor: Walter Meyer, Duisburg, Fed. Rep. of Germany

[73] Assignee: Deutsche Babcock Aktiengesellschaft, Oberhausen, Fed. Rep. of Germany

[21] Appl. No.: 830,313

[22] Filed: Sep. 2, 1977

[30] Foreign Application Priority Data

Nov. 15, 1976 [DE] Fed. Rep. of Germany ....... 2651986

[51] Int. Cl.² ............................................. F16K 17/02
[52] U.S. Cl. ..................................... 137/118; 137/506; 137/510; 251/335 B
[58] Field of Search ............... 137/506, 510, 118, 112; 251/335 B

[56] References Cited

U.S. PATENT DOCUMENTS

| | | | |
|---|---|---|---|
| 2,042,523 | 6/1936 | Graham | 251/335 B |
| 2,661,757 | 12/1953 | Lines | 137/118 |
| 2,827,077 | 3/1958 | Mitchell | 137/510 |
| 3,273,590 | 9/1966 | Woodward | 137/510 |
| 3,495,611 | 2/1970 | Topfer et al. | 137/112 |
| 3,751,988 | 8/1973 | Reese, Sr. | 251/335 B |
| 3,823,556 | 7/1974 | Goto et al. | 137/118 |

FOREIGN PATENT DOCUMENTS 2041722 4/1976 Fed. Rep. of Germany .
1011370 6/1952 France ..................................... 137/510

*Primary Examiner*—William R. Cline
*Assistant Examiner*—H. Jay Spiegel
*Attorney, Agent, or Firm*—Max Fogiel

[57] ABSTRACT

An arrangement for the prevention of excess pressure in housings of shut-off valves with varying pressure loads, in which an independent chamber is provided with two facing openings. These are connected by pressure lines to pipe sockets connected to the shut-off valves. The facing openings are closed by seals which are, in turn, connected gas-tight by elastic elements. Another pressure line discharges into the chamber space located outside the elastic elements, and this pressure line is connected to the interior of the housing of the shut-off valves. The sealing elements which close the facing openings, brace each other through a spring, and the sealing elements are connected gas-tight by a bellows. A center section is located between the sealing elements. Through drill holes in the center section and in the sealing elements, the facing openings discharge into a space enclosed by the center section, the bellows and associated sealing element. The springs are located inside the bellows and brace themselves on a sealing element and on the center section. A single spring located outside the bellows, rests against the two sealing elements.

6 Claims, 1 Drawing Figure

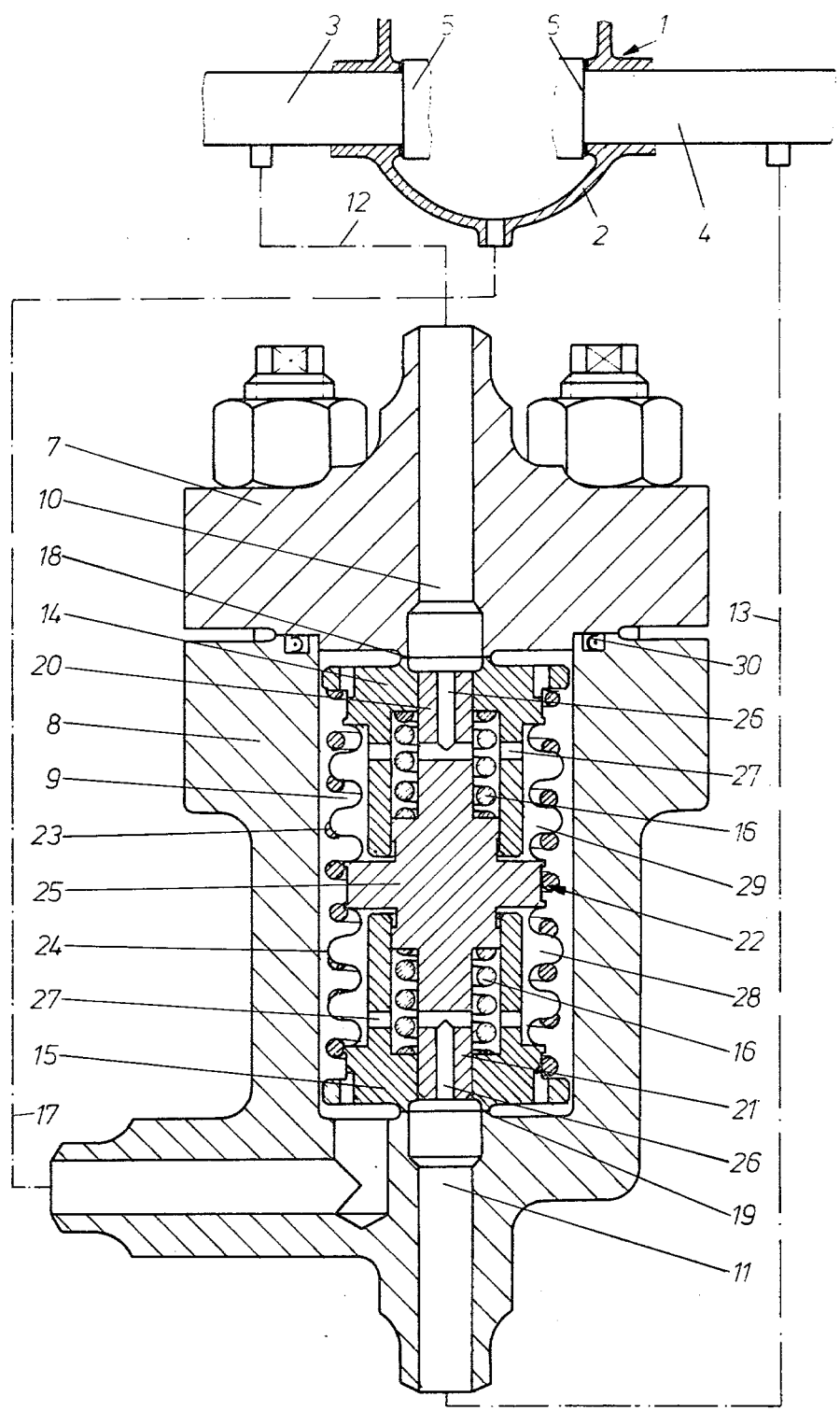

ARRANGEMENT FOR PREVENTING EXCESS PRESSURE IN THE HOUSING OF SHUT-OFF VALVES

BACKGROUND OF THE INVENTION

The present invention relates to an arrangement for the prevention of excess pressure in the housing of shut-off valves with varying pressure load where an independent chamber is provided with two facing openings which are connected via pressure lines to the pipe sockets connected to the shut-off valves, and which are closed by seals. The latter, in turn, are connected gas-tight via elastic elements, and where another pressure line discharges into the chamber space located outside the elastic element; this pressure line is connected to the interior of the housing of the shut-off valve.

An excess pressure safety device of the foregoing species is known from German Laid-Open Doc No. 2,041,722. This known arrangement can be further improved. The elastic element comprises a comparator. Because of the inherent rigidity of the metal compensator this excess pressure safety responds only at relatively high pressure differences so that the arrangement performs fully in the high-pressure range, but presents difficulties in the low-pressure range. In addition, the known safety device seals effectively only with pressure loads from one side in the direction of the housing of the shut-off valve. With load from the other side, a gap may form at the seating area of the seal; this gap creates a connection to the housing of the shut-off valve and puts it under pressure.

Accordingly, it is the object of the present invention to further develop the arrangement so that it seals on both sides and responds at low pressures also.

Another object of the present invention is to provide an arrangement of the foregoing character which is substantially simple in construction and may be economically fabricated.

A further object of the present invention is to provide an arrangement, as described, which may be readily maintained in service and which has a substantially long operating life.

SUMMARY OF THE INVENTION

The objects of the present invention are achieved by providing that the sealing elements closing the facing openings brace each other via a spring, and that the sealing elements are connected gas tight each via a bellows with a center section located between the sealing elements.

By using the metal bellows known and proven with shut-off valves, a permanent elasticity is guaranteed by the combination with the heat resistant helical spring and use is made possible even in the low-pressure range because of the low inherent rigidity of the metal bellows. By the double presence of the bellows and the separation of these bellows by the center section, the arrangement in accordance with the present invention seals in both directions.

In accordance with an embodiment of the present invention, the facing openings discharge through drill holes in the center section and the sealing elements into a space enclosed by the center section, the associate bellows and the associate sealing element.

The springs may be located inside the bellows and rest on a sealing element and on the center section. But only one spring may be provided which is outside the bellows and contacts both sealing elements.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 shows a lengthwise section taken through an excess pressure safety device in accordance with the present invention.

DESCRIPTION OF THE PREFERRED EMBODIMENTS

The shut-off valve 1 comprises a housing 2, the attached pipe sockets 3 and 4, and the shut-off elements 5 and 6 which are moved to their open or closed position by means of the screw or such (not shown). Independent of housing 2 of the shut-off valve 1, there is another housing 8 closed by a cover 7. Into chamber 9 formed inside housing 8, two facing openings 10 and 11 discharge through the cover 7 and the bottom of housing 8. The openings 10 and 11 are connected via pressure lines 12 and 13 with the pipe sockets 3 and 4. Chamber 9 has sealing elements 14 and 15, closing openings 10 and 11; these sealing elements are kept in the closed position by the force of a pretensioned heat-resistant helical spring 16. Into chamber 9 there discharges another pressure line 17 which is connected via the inside space of housing 2 to shut-off valve 1.

In the case shown, the sealing elements 14, 15 have valve cones which fit on seats 18, 19. The shanks 20, 21 of a center section 22 located between sealing elements 14, 15 pass through the central bore of sealing elements 14, 15. Spring 16 encloses shanks 20, 21 and rests on a shoulder of associated sealing element 14 or 15 and on a shoulder of center section 22 and thus holds sealing elements 14, 15 in the closed position.

The sealing elements 14, 15 are connected to the center section 22 via metal bellows 23, 24 and contact the center ring 25 of the center section. Openings 10, 11, through drill holes 26, 27 passing through shanks 20, 21 of the center section 22 and through the sidewalls of sealing elements 14, 15, are connected to spaces 28, 29 which are formed by bellows 23, 24, the sealing elements 14, 15 and the center section 22. The opening of housing 8, is connected to pressure line 17 and leads to chamber 9 outside the bellows 23, 24.

In operation of the excess pressure safety device according to the present invention, assume that the pressure comes from the pressure line 12 and pressure line 13 is without pressure. On seating area 18 acts a seating force resulting from the effective piston area of sealing element 14 and the pipeline pressure p and the initial stressing forces from bellows 23 and spring 16. If in housing 2 of the shut-off valve 1 an excess pressure $p_1$ develops, then there acts as relieving force a force resulting from the aforementioned effective piston area and the excess pressure $p_1$. If the excess pressure $p_1$ exceeds the pipeline pressure p by a certain differential pressure of, for example, 10 to 15 bars, the valve cone of sealing element 14 is lifted from seating area 18. Between valve cone and seating area there develops a gap whereby the housing 2 of shut-off valve 1 is relieved.

When pressure comes from the pressure line 13, relief of housing 2 of shut-off valve 1 is also towards pressure line 13. Hence the relief is always towards the pressure side. By means of the initial stressing forces of spring 16 and bellows 23, 24, the differential pressure at which relief takes place by lifting one of the sealing elements 14, 15, can be set to low values.

Housing 8, besides the form shown, may also comprise a housing pipe closed by two covers which are tightened by two screws. In this case also, a seal 30 between cover 7 and housing wall provides sealing against the outside. Spring 13 located in this design inside the bellows 23, 24 can also enclose the bellows from the outside and rest only against the flanks of the two sealing elements 14 and 15.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. An arrangement for the prevention of excess pressure comprising: an independent chamber; a shut-off valve with varying pressure load, said shut-off valve having a housing, two pipe sockets connected to said housing and facing each other and shut-off elements for closing said two pipe sockets; said independent chamber having two facing openings; pressure lines connecting said two facing openings to said pipe sockets; seal means and elastic elements for closing said openings; said elastic elements comprising bellow means; said seal means being connected gas-tight by said bellow means; said chamber having a space located outside said bellow means; an auxiliary pressure line discharging into said chamber space, said auxiliary pressure line being connected to the interior of said housing of said shut-off valve between said two pipe sockets; spring means; said seal means having elements urged apart by said spring means; and a center section located between elements of said seal means and connected to said seal means by said bellow means.

2. An arrangement as defined in claim 1 wherein said center section has drill holes, each of said bellows means enclosing a space between said center section and one of said seal means having a hole opposite said openings of said chamber, said drill holes discharging into said space and connecting said space to an adjacent opening of said chamber.

3. An arrangement as defined in claim 1 wherein said spring means comprises springs inside said bellows means, said bellows means comprising two bellows, each of said springs resting on a sealing element and on said center section.

4. An arrangement as defined in claim 1 including a single spring outside said bellows means and resting against said two sealing elements.

5. An arrangement as defined in claim 1 wherein said center section, said bellows means and each of the sealing elements form auxiliary spaces, said center section and said sealing elements having drill holes, said facing openings discharging through said drill holes into each auxiliary space, said spring means comprising springs located inside said bellows means, said bellows means comprising two bellows, said springs bracing themselves on a sealing element and on said center section, said spring means being helical and being heat-resistant, said center section having shanks located between said sealing elements and passing through a central bore of said sealing elements, said spring means enclosing said shanks and resting on a shoulder of said sealing elements and on a shoulder of said center section for holding said sealing elements in closed position, said sealing elements being connected to said center section by said bellows means.

6. An arrangement as defined in claim 1 wherein said bellows means is comprised of metal.

* * * * *